United States Patent [19]
Cevales

[11] 3,754,950
[45] Aug. 28, 1973

[54] THERMAL TREATMENT OF ELECTROMELTED REFRACTORY MATERIALS

[75] Inventor: Giacomo Cevales, Venezia, Italy

[73] Assignee: Refradige S. p. A., Milano, Italy

[22] Filed: July 9, 1971

[21] Appl. No.: 161,268

[30] Foreign Application Priority Data
July 13, 1970  Italy.............................. 27345 A/70

[52] U.S. Cl..................................... 106/57, 106/65
[51] Int. Cl. ..................... C04b 35/18, C04b 35/48
[58] Field of Search................................ 106/57, 65

[56] References Cited
UNITED STATES PATENTS
| | | | |
|---|---|---|---|
| 2,919,994 | 1/1960 | Steimke ...................................... | 106/57 |
| 3,079,452 | 2/1963 | Grollier-Baron et al.............. | 106/57 |
| 3,541,193 | 11/1970 | Adams................................... | 106/57 |

FOREIGN PATENTS OR APPLICATIONS
1,914,982  10/1969  Germany.............................. 106/57

*Primary Examiner*—James E. Poer
*Attorney*—Stevens, Davis, Miller & Mosher

[57]        ABSTRACT

A process is disclosed for imparting an increased corrosion resistance to electromelted refractory materials of the AZS type (alumina, zirconia, silica) comprising crystalline phases and one vitreous phase, the process being characterized in that the refractory material is subjected to a controlled thermal treatment at temperatures between 1300°C and 1600°C. The starting material has a chemical composition, expressed in oxides, within the following weight ranges: $Al_2O_3$ = 45–65%, $ZrO_2$ = 10–40%, $SiO_2$ = 12–20%, $Na_2O$ = 0.8–1.4%, corresponding to the following weight ranges of the individual phases: Corundum = 30–60%, Baddeleyite = 10–40%, Mullite = 0–40%, vitreous phase = 15–25%.

4 Claims, No Drawings

THERMAL TREATMENT OF ELECTROMELTED REFRACTORY MATERIALS

The present invention relates to a thermal treatment of electromelted refractory materials, and more particularly, to a thermal treatment of electromelted refractory materials having a vitreous phase.

It is well known that during the cooling off of molten refractory material, the solid material thus obtained turns out to be composed of phases that may be in conditions of metastability and that, consequently, these phases may be modified when subjected to further treatments.

It is also well known that when such solid materials are used as a lining for glass-melting furnaces or for furnaces for heating up steel ingots-by reason of which they come into contact with molten glass or with slag-the vitreous phase plays an important role in the corrosion phenomena.

Thus, a principal object of this invention is that of providing a method for reducing the vitreous phase of the electromelted material so as to render same more corrosion resistant.

Another object of the invention is that of producing in the starting material permanent modifications, not so much in the chemical composition as rather in the relationships between the crystalline and the vitreous phases, in order to obtain an end product that will have a substantially improved resistance to corrosion.

These as well as other objects are attained by the method of the present invention, which consists essentially in subjecting the refractory material to a controlled thermal treatment, operating at temperatures between 1,300° and 1,600°C, but preferably between 1,500° and 1,600°C.

The thermal treatment may be carried out, instead of on already-formed refractory material, also on material that is still in an intermediate processing stage, and more particularly after its having been poured into the mold and after having allowed a sufficient lapse of time for the formation of a first solid shell. In order that the phases constituting the starting material may be in a condition to undergo modifications and attain conditions of stable equilibrium, it is necessary that the thermal treatment be prolonged for a period of time between 8 and 12 days and, speaking generally, about 10 days.

Starting materials that prove to be particularly suited for the present purpose are the electromelted refractory materials of the AZS type (alumina, zirconia, silica) having a vitreous phase and a chemical composition, expressed as oxides, falling within the following ranges: $Al_2O_3$ = 45–65%, $ZrO_2$ = 10–40%, $SiO_2$ = 12–20%, $Na_2O$ = 0.8–1.4%, corresponding to the following ranges of the single phases: corundum = 30–60%, baddeleyite = 10–40%, mullite = 0–40%, and vitreous phase = 15–25%. All percentages here and elsewhere are by weight.

After thermal treatment, one obtains a product the individual phases of which fall, according to the treatment temperatures, within the following ranges:

| Phases | Treatment Temperatures | | | |
|---|---|---|---|---|
| | 1300°C % | 1400°C % | 1500°C % | 1600°C % |
| Corundum | 30–50 | 30–40 | 20–30 | 10–22 |
| Baddeleyite | 10–40 | 9–38 | 9–35 | 9–35 |
| Mullite | 10–40 | 15–48 | 18–54 | 35–60 |
| Vitreous phase | 14–18 | 12–14 | 10–12 | 7–9 |

The vitreous phase may be reduced down to 7 percent; also its composition turns out to be modified as will be seen from the following tables. The determination of the single phases was carried out by means of chemical analysis and by diffractometric X-ray analysis. The method used for the analysis of the vitreous phase was the commonly used one of extraction with hydrofluoric acid.

For the thermal treatment there may be used any conventional kind of furnace operating with gaseous or liquid fuels, provided that it be equipped with means insuring the desired control of the processing temperature.

At the end of the residence time in the furnace at the established temperature, the refractory material is left to cool down at an average rate of temperature drop of 120°–150°C per day.

In order still more clearly to illustrate the present invention, the following illustrative nonlimiting examples are given:

EXAMPLE 1

A sample of electromelted Zetacor A refractory, produced by MONTECATINI EDISON, and having the following composition:

| | |
|---|---|
| $Al_2O_3$ | 47.7% |
| $ZrO_2$ | 36.1 |
| $SiO_2$ | 14.7 |
| $Na_2O$ | 1.0 |
| $Fe_2O_3$ | 0.06 |
| $TiO_2$ | 0.04 |
| CaO | 0.22 |
| MgO | 0.05 | was heated in a furnace fired by oil burners, at temperatures between 1,300° and 1,600°C. The duration of the treatment was 240 hours.

In Table 1 are given the data concerning the ranges of the crystalline and vitreous phases of the starting product as well as the data concerning the samples after treatment for 240 hours at 1,300°, 1,400°, 1,500°, and 1,600°C.

TABLE 1

| Phases | Starting product as such % | Product after treatment at the temperature of | | | |
|---|---|---|---|---|---|
| | | 1300°C % | 1400°C % | 1500°C % | 1600°C % |
| Corundum | 43 | 38 | 29 | 20 | 12 |
| Baddeleyite | 36 | 35 | 34 | 34 | 34 |
| Mullite | 3 | 15 | 25 | 36 | 46 |
| Vitreous phase | 18 | 14 | 12 | 10 | 8 |

In Table 1 bis are recorded the compositions of the vitreous phase of the starting material and of the samples subjected to thermal treatment:

TABLE 1 bis

| Component | Vitreous phase extracted on the starting products as such % | Vitreous Phase Extracted after a treatment of 240 hours at the temperatures indicated | | | |
|---|---|---|---|---|---|
| | | 1300°C % | 1400°C % | 1500°C % | 1600°C % |
| $Al_2O_3$ | 21.9 | 29.10 | 34.20 | 42.9 | 47.6 |
| $ZrO_2$ | 4.9 | 6.91 | 9.07 | 12.0 | 15.7 |
| $SiO_2$ | 67.05 | 57.10 | 49.52 | 38.44 | 30.99 |
| $Na_2O$ | 5.45 | 5.93 | 6.10 | 5.20 | 3.87 |
| $Fe_2O_3$ | 0.21 | 0.27 | 0.27 | 0.35 | 0.60 |
| $TiO_2$ | 0.13 | 0.11 | 0.13 | 0.14 | 0.24 |
| CaO | 0.36 | 0.58 | 0.71 | 0.97 | 1.00 |

EXAMPLE 2

Another example of the same material as that used in Example 1 and having the following composition:

| | % |
|---|---|
| $Al_2O_3$ | 46.7 |
| $ZrO_2$ | 38.0 |
| $SiO_2$ | 14.0 |
| $Na_2O$ | 1.06 |
| $Fe_2O_3$ | 0.05 |
| $TiO_2$ | 0.04 |
| CaO | 0.22 |
| MgO | 0.05 | is subjected to heating at a temperature between 1,300° and 1,600°C for 240 hours.

The following Table 2 reports the data concerning the ranges of the crystalline and vitreous phases of the starting product and of the samples subjected to thermal treatment, while Table 2 bis shows the compositions of the corresponding vitreous phases.

TABLE 2

| Phases | Starting Product as Such % | Product after Thermal Treatment at: | | | |
|---|---|---|---|---|---|
| | | 1300°C % | 1400°C % | 1500°C % | 1600°C % |
| Corundum | 42 | 38 | 30 | 20 | 12 |
| Baddeleyite | 37 | 37 | 36 | 35 | 35 |
| Mullite | 2 | 10 | 22 | 35 | 44 |
| Vitreous Phase | 19 | 15 | 12 | 10 | 9 |

TABLE 2 bis

| Components | Vitreous Phase extracted on the Starting products as such | Vitreous phase extracted after a treatment of 240 hours at the temperatures indicated | | | |
|---|---|---|---|---|---|
| | | 1300°C % | 1400°C % | 1500°C % | 1600°C % |
| $Al_2O_3$ | 23.2 % | 25.3 | 28.6 | 35.4 | 49.6 |
| $ZrO_2$ | 5.6 | 5.92 | 7.13 | 8.30 | 18.0 |
| $SiO_2$ | 64.93 | 61.75 | 56.68 | 49.20 | 27.92 |
| $Na_2O$ | 5.6 | 6.14 | 6.44 | 5.8 | 2.75 |
| $Fe_2O_3$ | 0.17 | 0.20 | 0.35 | 0.29 | 0.49 |
| $TiO_2$ | 0.15 | 0.15 | 0.13 | 0.13 | 0.19 |
| CaO | 0.35 | 0.54 | 0.67 | 0.84 | 1.05 |

EXAMPLE 3

A sample of ZAC 1681, of the following composition:

| | % |
|---|---|
| $Al_2O_3$ | 50.0 |
| $ZrO_2$ | 31.5 |
| $SiO_2$ | 16.8 |
| $Na_2O$ | 1.43 |
| $Fe_2O_3$ | 0.08 |
| $TiO_2$ | 0.06 |
| CaO | 0.28 |
| MgO | 0.05 | was subjected to a thermal treatment at temperatures between 1,300° and 1,600°C, for 240 hours. In the following Table 3 are recorded the data relating to the ranges of the crystalline and vitreous phases of the starting product and of the sample subjected to the thermal treatment. Table 3 bis records the compositions of the corresponding vitreous phases.

TABLE 3

| Phases | Starting Product as Such % | Product after Thermal Treatment at: | | | |
|---|---|---|---|---|---|
| | | 1300°C % | 1400°C % | 1500°C % | 1600°C % |
| Corundum | 45 | 44 | 33 | 22 | 15 |
| Baddeleyite | 31 | 30 | 29 | 29 | 29 |
| Mullite | 0 | 10 | 26 | 39 | 47 |
| Vitreous Phase | 24 | 16 | 12 | 10 | 9 |

TABLE 3 bis

| Components | Vitreous phase extracted on the starting products as such | Vitreous phase extracted after a treatment of 240 hours at the temperatures indicated | | | |
|---|---|---|---|---|---|
| | | 1300°C % | 1400°C % | 1500°C % | 1600°C % |
| $Al_2O_3$ | 21.1 | 22.6 | 27.6 | 33.2 | 42.6 |
| $ZrO_2$ | 3.63 | 4.36 | 5.54 | 5.59 | 11.6 |
| $SiO_2$ | 68.94 | 65.98 | 59.26 | 52.29 | 39.51 |
| $Na_2O$ | 5.60 | 6.32 | 6.65 | 6.54 | 4.70 |
| $Fe_2O_3$ | 0.18 | 0.15 | 0.21 | 0.43 | 0.52 |
| $TiO_2$ | 0.20 | 0.18 | 0.19 | 0.18 | 0.19 |
| CaO | 0.35 | 0.41 | 0.55 | 0.77 | 0.88 |

EXAMPLE 4

A sample of Zetacor A, of the following composition:

| | |
|---|---|
| $Al_2O_3$ | 48.3 % |
| $ZrO_2$ | 34.7 |
| $SiO_2$ | 15.1 |
| $Na_2O$ | 1.04 |
| $Fe_2O_3$ | 0.07 |
| $TiO_2$ | 0.05 |
| CaO | 0.13 | was treated for 240 hours at a temperature of 1,450°C, following the procedures described in Example 1. In Table 4 are recorded the data relating to the ranges of the crystalline and vitreous ranges of the starting product and of the sample treated at 1,450°C. Table 4 bis records the compositions of the corresponding vitreous phases.

TABLE 4

| Phases | Starting Product % | Product after Treatment at a temperature of 1450°C % |
|---|---|---|
| Corundum | 47 | 35 |
| Baddeleyite | 33 | 33 |
| Mullite | 2 | 19 |
| Vitreous phase | 18 | 13 |

TABLE 4 bis

| Components | Vitreous phase extracted on the starting product % | Vitreous Phase Extracted after Treatment for 240 Hours at 1450°C % |
|---|---|---|
| $Al_2O_3$ | 20.7 | 28.9 |
| $ZrO_2$ | 6.0 | 8.7 |
| $SiO_2$ | 67.13 | 54.79 |
| $Na_2O$ | 5.3 | 6.77 |
| $Fe_2O_3$ | 0.37 | 0.18 |
| $TiO_2$ | 0.18 | 0.13 |
| CaO | 0.32 | 0.53 |

EXAMPLE 5

A sample of Zetacor A, having the following composition:

| | |
|---|---|
| $Al_2O_3$ | 49.6 % |
| $ZrO_2$ | 31.2 |
| $SiO_2$ | 16.9 |
| $Na_2O$ | 1.26 |
| $Fe_2O_3$ | 0.05 |
| $TiO_2$ | 0.05 |
| CaO | 0.12 | was treated for 240 hours at a temperature of 1,450°C, following the procedures described in Example 1. In Table 5 are recorded data relating to the ranges of the crystalline and vitreous phases of the starting product and of the samples treated at 1,450°C. In Table 5 bis are recorded the corresponding compositions of the vitreous phases.

TABLE 5

| Phases | Starting Product % | Product after Treatment at a Temperature of 1450°C % |
|---|---|---|
| Corundum | 47 | 39 |
| Baddeleyite | 30 | 30 |
| Mullite | 3 | 19 |
| Vitreous Phase | 20 | 12 |

TABLE 5 bis

| Component | Vitreous Phase Extracted on the Starting Product % | Vitreous Phase Extracted after treatment for 240 Hours at 1450°C % |
|---|---|---|
| $Al_2O_3$ | 20.6 | 32.6 |
| $ZrO_2$ | 5.7 | 7.4 |
| $SiO_2$ | 67.10 | 51.64 |
| $Na_2O$ | 5.7 | 7.4 |
| $Fe_2O_3$ | 0.33 | 0.29 |
| $TiO_2$ | 0.24 | 0.21 |
| CaO | 0.33 | 0.46 |

EXAMPLE 6

A sample of Mecsial C / 15, produced by MONTECATINI EDI-SON, and having the following composition:

| | % |
|---|---|
| $Al_2O_3$ | 63.5 |
| $ZrO_2$ | 12.0 |
| $SiO_2$ | 20.5 |
| $Na_2O$ | 1.28 |
| $Fe_2O_3$ | 0.53 |
| $TiO_2$ | 1.95 |
| CaO | 0.27 | was subjected to a thermal treatment for 240 hours at 1,350°C. In Table 6 are recorded all the data relating to the ranges of the crystalline and vitreous phases of the starting product as such and of the sample treated at 1,350°C. In Table 6 bis are recorded the corresponding compositions of the vitreous phase.

TABLE 6

| Phases | Starting Product as such % | Product after Treatment at a Temperature of 1350°C % |
|---|---|---|
| Corundum | 36 | 29 |
| Baddeleyite | 11 | 11 |
| Mullite | 34 | 45 |
| Vitreous phase | 19 | 15 |

TABLE 6 bis

| Component | Vitreous Phase Extracted on the Starting Product as such % | Vitreous Phase Extracted after Treatment for 240 Hours at 1350°C % |
|---|---|---|
| $Al_2O_3$ | 16.1 | 18.9 |
| $ZrO_2$ | 1.26 | 2.02 |
| $SiO_2$ | 72.67 | 68.19 |
| $Na_2O$ | 4.60 | 5.78 |
| $Fe_2O_3$ | 2.09 | 2.32 |
| $TiO_2$ | 2.95 | 2.22 |
| CaO | 0.33 | 0.57 |

What is claimed is:

1. A thermal treatment process for improving the corrosion resistance of fused refractory materials made from a batch comprising, on the basis of the oxides, 45 to 65 percent by weight of $Al_2O_3$, 10 to 40 percent by weight of $ZrO_2$, 12 to 20 percent by weight of $SiO_2$ and 0.8 to 1.4 percent by weight of $Na_2O$, and constituted initially of 30 to 60 percent by weight of corundum, 10 to 40 percent by weight of baddeleyite, 0 to 40 percent by weight of mullite as crystalline phases and 15 to 25 percent by weight of a vitreous phase, said process comprising maintaining the refractory material at a temperature between 1,300° and 1,600°C for 8 to 12 days.

2. A process as claimed in claim 1, wherein said thermal treatment is carried out at a temperature between 1,500° and 1,600°C.

3. A process as claimed in claim 1, wherein the duration of the thermal treatment is about 10 days.

4. A process as claimed in claim 1, wherein the refractory material, after the said thermal treatment, is slowly cooled at a rate of about 120° to 150°C per day.

* * * * *